US007705953B2

(12) United States Patent
Sato

(10) Patent No.: US 7,705,953 B2
(45) Date of Patent: Apr. 27, 2010

(54) DISPLAY DEVICE WHEREIN A TERMINATION RESISTOR IS FORMED ON A SECOND CONNECTING SUBSTRATE

(75) Inventor: Setsuko Sato, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 191 days.

(21) Appl. No.: 12/099,202

(22) Filed: Apr. 8, 2008

(65) Prior Publication Data

US 2008/0316382 A1 Dec. 25, 2008

(30) Foreign Application Priority Data

Apr. 9, 2007 (JP) ............................ 2007-101315

(51) Int. Cl.
*G02F 1/1345* (2006.01)

(52) U.S. Cl. ....................... 349/151; 345/204; 345/206; 349/149

(58) Field of Classification Search .................. 349/150
See application file for complete search history.

(56) References Cited

U.S. PATENT DOCUMENTS

2004/0104903 A1* 6/2004 You ........................... 345/204

FOREIGN PATENT DOCUMENTS

| | | | |
|---|---|---|---|
| JE | 2006-066674 | A | 3/2006 |
| JP | 2539438 | Y2 | 4/1997 |
| JP | 10-260391 | A | 9/1998 |
| JP | 2003-66861 | A | 3/2003 |
| JP | 2004-102259 | A | 4/2004 |
| JP | 2005-503073 | A | 1/2005 |
| JP | 3660216 | B2 | 3/2005 |

* cited by examiner

*Primary Examiner*—Richard H Kim
(74) *Attorney, Agent, or Firm*—Sughrue Mion, PLLC

(57) ABSTRACT

Disclosed is a display device including: a display panel on which a plurality of driver chips are mounted by using a COG configuration; a signal substrate on which a timing controller for generating a differential signal inputted into each of the driver chips is formed; and a connecting substrate which connects the plurality of driver chips with the timing controller, wherein the connecting substrate includes a first connecting substrate on which a first line for inputting the differential signal into a driver chip excluding a driver chip located at a terminating area is formed and a second connecting substrate on which a second line for inputting the differential signal into the driver chip located at the terminating area, and wherein a termination resistor connects the second line for transmitting the differential signal which is formed on the second connecting substrate.

7 Claims, 8 Drawing Sheets

1 LIQUID CRYSTAL DISPLAY

DISPLAY DEVICE WHEREIN A TERMINATION RESISTOR IS FORMED ON A SECOND CONNECTING SUBSTRATE

INCORPORATION BY REFERENCE

This application is based upon and claims the benefit of priority from Japanese Patent Application No. 2007-101315, filed on Apr. 9, 2007, the disclosure of which is incorporated herein in its entirety by reference.

BACKGROUND OF THE INVENTION

1. Technical Field

The present invention relates to a display device and in particular, relates to a structure of a connecting substrate which connects a driver chip mounted on a display panel and a timing controller formed on a signal substrate.

2. Background Art

A display device is used for an audio visual apparatus and an office automation apparatus. A liquid crystal display includes advantages such as thin thickness, light weight, and low power consumption. Therefore, it is widely used for a display device. The liquid crystal display includes a liquid crystal panel, an integrated circuit for drive (driver chip), an external signal substrate, a connecting substrate and the like. In the liquid crystal panel, liquid crystal is sandwiched between two substrates. In one substrate, a switching element such as a TFT (Thin Film Transistor) is formed in a matrix shape, and in another substrate, a color filter (CF), a black matrix (BM) and the like are formed. The integrated circuit for drive is mounted on a substrate having the TFT of the display panel, or mounted on a flexible substrate. The connecting substrate connects the liquid crystal panel and the external signal substrate.

Here, because a large number of lines are formed in the liquid crystal display, EMI (Electro Magnetic Interference) easily occurs. For this reason, a differential signal is used for a control signal that controls the driver chip in the liquid crystal display. LVDS (Low Voltage Differential Signaling), RSDS (Reduced Swing Differential Signaling) and the like are known as a specification for differential signal transmission. As shown in FIG. 6, a pair of signal lines is used for differential signal transmission. One of two signal lines is set as a line on a positive side and another is set as a line on a negative side. A potential difference between the two signal lines represents a signal level. In order to make each of electrical lengths of two signal lines equal, the two signal lines are connected to two terminals that are adjacent to each other and a termination resistor 5 is arranged to make a potential difference on a receiving side. Having an improved resistance to noise compared with a single end transmission system, such configuration is suitable for a high speed data transmission, and therefore is widely used for many applications.

A connecting substrate of a liquid crystal display in a related technology which uses a differential signal as mentioned above will be described with reference to FIG. 7, FIG. 8A and FIG. 8B. FIG. 7 illustrates a configuration of a part of a liquid crystal display employing a Chip on Glass (hereinafter, referred to as “COG”) configuration in which a driver chip is mounted on a substrate of a liquid crystal panel. FIG. 8A is a plan view showing a configuration of a connecting substrate corresponding to a driver chip excluding a driver chip for a termination in a connecting substrate of a related technology. FIG. 8B is a plan view showing a configuration of a connecting substrate corresponding to a driver chip for a termination in a connecting substrate of a related technology.

As shown in FIG. 7, in the liquid crystal display using a related technology, a plurality of driver chips 3 are mounted on an edge area of one substrate (for example, TFT substrate) of substrates which the liquid crystal panel 2 is composed of. A differential signal which is generated by a timing controller 8 in an external signal substrate 7 is inputted into the plurality of driver chips 3 via one connecting substrate 9. As shown in FIG. 8A, a positive line and a negative line transmitting a differential signal are directly connected to a first to a n-1 th drivers of the above-mentioned driver chips 3 respectively. As shown in FIG. 8B, with respect to an n-th driver placed in a position which is the most far from the timing controller 8, a differential signal is terminated by the termination resistor 5 which is placed between the positive line and the negative line and mounted on the connecting substrate 9 and inputted to the n-th driver. In order to reduce influence of impedance and a noise in a transmission line, the termination resistor 5 is placed near an end of the line in a receiving side. When a plurality of drivers is simultaneously driven, it is desirable that the lines are arranged in an L shape or a T shape and the termination resistor 5 is placed at a signal end.

A TCP (Tape Carrier Package) configuration in which a driver chip is mounted on a polyimide resin film having copper lines is also known as a method for mounting a driver chips. A liquid crystal display using the TCP method is disclosed in, for example, Japanese Patent Application Laid-Open No. 2004-102259. In the bulletin, a display device which includes a first and a second line, a termination resistor and a differential signal reception unit is disclosed. The first and second lines transmit data of a differential signal transmission system. The termination resistor defines a voltage according to a difference voltage of a differential signal transmitted by the first and second lines. The differential signal reception unit receives data according to a voltage defined by the termination resistor and converts the data. In the display device, the differential signal reception unit and the termination resistor are formed on the same integrated circuit.

Here, whole line impedance including the connecting substrate 9 for a differential signal differs depending on a display size or component layout of a liquid crystal display. Thus, a resistance value of the termination resistor 5 for making a matching may be selected depending on a condition of the liquid crystal display.

However, in a liquid crystal display employing the COG configuration that is a related technology shown in FIG. 7, lines connecting the first to the n-th drivers and the timing controller 8 are formed on the single connecting substrate 9, and the termination resistor 5 near the n-th driver is also formed on the connecting substrate 9. For this reason, when a resistance value of the termination resistor 5 is varied, the whole connecting substrate 9 needs to be replaced, and an unnecessary cost occurs.

Since a liquid crystal display using a TCP configuration shown in the above-mentioned bulletin (Japanese Patent Application Laid-Open No. 2004-102259) includes a configuration in which a differential signal reception unit and a termination resistor are formed on the same integrated circuit, changing a resistance value is difficult compared with the termination resistor 5 which is formed on a mounting board. Thus, it is difficult to flexibly select a resistance value. In the TCP configuration, since other two kinds of integrated circuits are required for termination, unnecessary cost for management of mounted components, change of a manufacturing process and the like inevitably occurs.

A liquid crystal display panel in which a driver chip is mounted on a glass substrate by using a COG configuration is disclosed in Japanese Patent Application Laid-Open No.

2006-066674. A differential line driver having a termination resistor is disclosed in Japanese Patent Application Laid-Open No. 2005-503073 (Published Japanese translation of WO2003/024040). A liquid crystal display separately having a first common signal line substrate and a second common signal line substrate is disclosed in Japanese Utility Model Registration No. 2539438 bulletin. A display device in which a discrete circuit component is mounted on a component mounting substrate is disclosed in Japanese Patent Application Laid-Open No. 2003-066861. A liquid crystal display in which a termination resistor is provided on a substrate is disclosed in Japanese Patent Application Laid-Open No. Hei-10-260391 (1998-260391). A matrix type display device in which the same display substrates can be used and cost reduction can be achieved by standardizing members is disclosed in Japanese Patent Registration No. 3660216.

SUMMARY

An exemplary object of the present invention is to provide a display device in which changing a termination resistor can be easily performed and also a cost reduction can be realized, particularly in a liquid crystal display using a COG method.

A display device according to an exemplary aspect of the invention includes a display panel on which a plurality of driver chips are mounted by using a COG configuration; a signal substrate on which a timing controller for generating a differential signal inputted into each of the driver chips is formed; and a connecting substrate which connects the plurality of driver chips with the timing controller, wherein the connecting substrate includes a first connecting substrate on which a first line for inputting the differential signal into a driver chip excluding a driver chip located at a terminating area is formed and a second connecting substrate on which a second line for inputting the differential signal into the driver chip located at the terminating area, and wherein a termination resistor connects the second line for transmitting the differential signal which is formed on the second connecting substrate.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

As described as a related technology, in a liquid crystal display using a COG configuration, in order to input a differential signal into a driver chip for driving a liquid crystal panel, one connecting substrate having a termination resistor typically connects an external signal substrate with a driver chip. In a liquid crystal display using a TCP configuration, a differential signal reception unit and a termination resistor are formed on the same integrated circuit.

However, since whole line impedance including the connecting substrate for the differential signal differs depending on a display size or a component layout of the liquid crystal display, a resistance value of the termination resistor may be changed for making matching. Then, if a signal substrate is connected with a driver chip by using one connecting substrate, the entire connecting substrate has to be replaced. In a configuration in which a differential signal reception unit and a termination resistor are formed on the same integrated circuit, changing a resistance value is not easy compared with the COG configuration. Thus, an unnecessary cost for management of mounted components and change of a manufacturing process increases.

Accordingly, in the present invention, a connecting substrate for connecting a plurality of driver chips with a timing controller includes a first connecting substrate and a second connecting substrate. A line to the driver chip excluding the driver chip which is the most far from the timing controller (i.e. a driver chip located at a terminating area) is formed on the first connecting substrate. A line to the driver chip located at a terminating area and the termination resistor are formed on the second connecting substrate.

A configuration in which lines to all driver chips are formed on the first connecting substrate is possible.

The connecting substrate includes two or more than two discrete connecting substrates. That is, the connecting substrate having a termination resistor is separated. As a result, only the second connecting substrate may be replaced when a resistance value of the termination resistor is changed. The termination resistor can be easily changed and also a cost reduction can be realized by standardizing the connecting substrate. Hereinafter, it will be described in detail with reference to a drawing.

First Exemplary Embodiment

Figure 1:
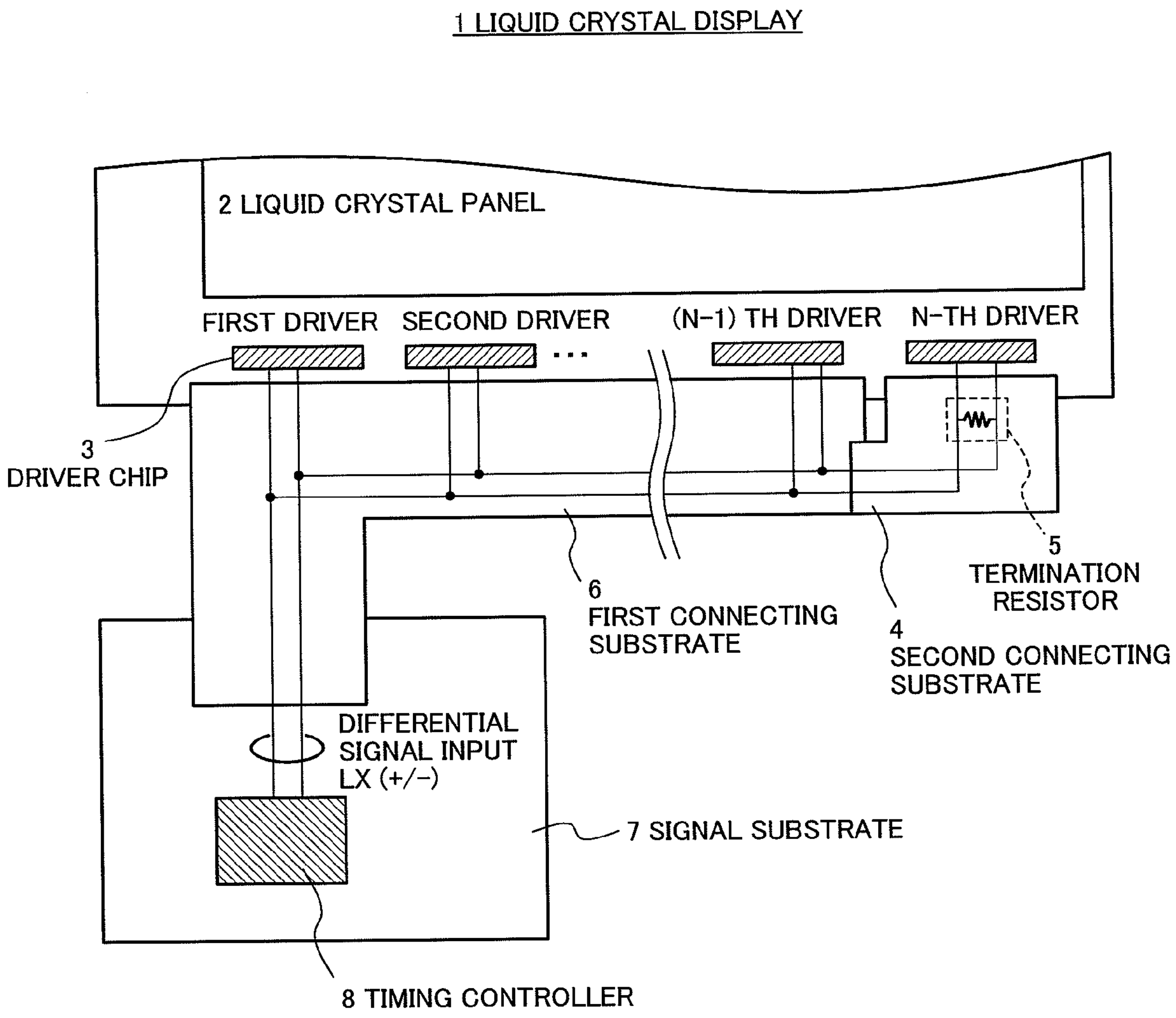
FIG. 1 is a view schematically showing a configuration of a part of a liquid crystal display according to a first exemplary embodiment.
Figure 2:
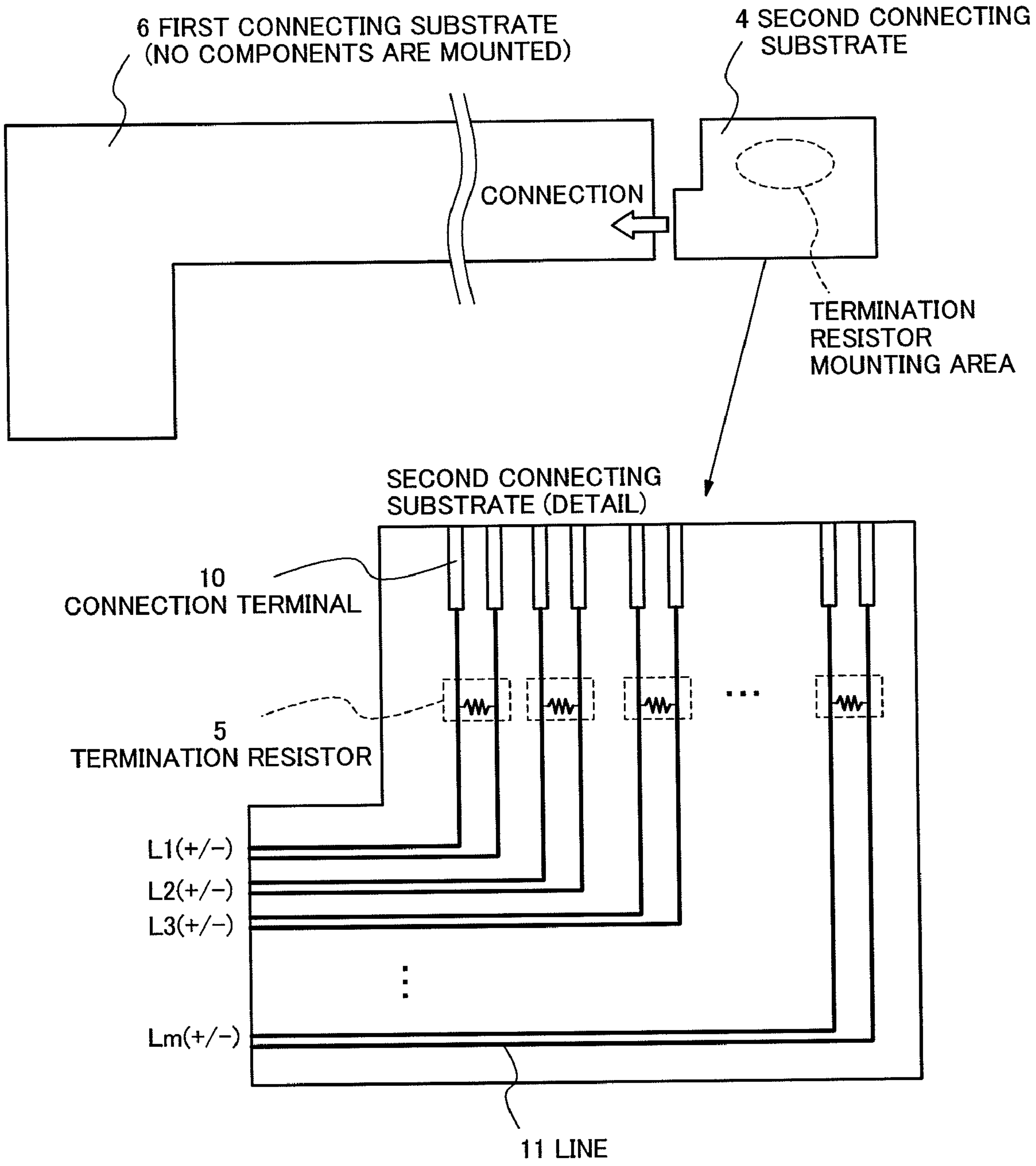
FIG. 2 is a plan view showing a configuration of a connecting substrate according to a first exemplary embodiment and an enlarged view showing a second connecting substrate.

First, a display device according to the first exemplary embodiment of the present invention will be described with reference to FIG. 1 and FIG. 2. FIG. 1 is an external view schematically showing a configuration of a part of the display device according to the first exemplary embodiment of the present invention. FIG. 2 is a plan view showing a structure of a connecting substrate according to the exemplary embodiment.

A liquid crystal display 1 includes a liquid crystal panel 2, a backlight unit (not shown) which illuminates the liquid crystal panel 2 and the like. The liquid crystal panel 2 includes an active matrix substrate (hereinafter referred to as TFT substrate), an opposed substrate (hereinafter referred to as CF substrate), a liquid crystal material, an integrated circuit for drive (hereinafter, referred to as a driver chip 3), a signal substrate 7 and connecting substrates. A switching element such as a TFT is formed in a matrix shape on the TFT substrate. The CF substrate faces the TFT substrate. The liquid crystal material is sandwiched between the TFT substrate and the CF substrate. The driver chip 3 is a horizontal driver which is mounted on one of the two substrates of a COG configuration. A control circuit (hereinafter, referred to as a timing controller 8) for generating a differential signal is formed on the signal substrate 7. The connecting substrates connect the timing controller 8 with the driver chip 3.

Here, as mentioned above, in a related technology, one connecting substrate includes lines which connect the timing controller 8 with all the driver chips (the first to the n-th driver) and the termination resistor near the driver chip 3 located at a terminating area. For this reason, in the related technology, since a resistance value of the termination resistor can not be easily changed according to a display size and a component layout, a component cost and a mounting cost are increased by replacing an entire connecting substrate.

Accordingly, in the exemplary embodiment, the above-mentioned connecting substrates include a first connecting substrate 6 on which first lines which connect the timing controller 8 with the driver chips 3 (the first to the (n-1) th driver, "n" is a positive number of two or more than two) excluding the driver chip located at a terminating area are formed and a second connecting substrate 4 on which a second line which connects the timing controller 8 with the driver chip 3 (the n-th driver) located at a terminating area and the termination resistor 5 are formed. Moreover, soldering, pressure bonding, an anisotropic conductive adhesive (i.e. ACF: Anisotropic Conductive Film) or the like electrically connect between the signal substrate 7 and the first connecting substrate 6, between the first connecting substrate 6 and the second connecting substrate 4, between the first connecting substrate 6 and the liquid crystal panel 2, and between the second connecting substrate 4 and the liquid crystal panel 2 are electrically connected, respectively.

Specifically, as shown in FIG. 2, the second connecting substrate 4 includes m pairs of second lines 11 ("m" is a positive number of one or more than one) which transmit differential signals L1 (+/−) to Lm (+/−) with a positive and negative polarity (+/−) to the driver chip 3 (the n-th driver) located at a terminating area. The termination resistor 5 is formed between two lines for each differential signal in a termination resistor mounting region near the driver chip 3 and it is desirable that a plurality of termination resistors 5 are arranged so that distances between respective termination resistors 5 and the driver chip 3 located at a terminating area become substantially equal to each other.

Further, any method can be used for forming the second lines 11 and the termination resistor 5. For example, the termination resistor 5 can be formed by etching a metal film (e.g. copper thin film) on an insulating film (e.g. polyimide resin film) or the like.

In FIG. 1 and FIG. 2, although the connecting substrates include two substrates, the first connecting substrate 6 and the second connecting substrate 4, it is required that a connecting substrate corresponding to the driver chip 3 located at a terminating area can be separated from the other connecting substrate. For example, the first connecting substrate 6 corresponding to the first to the (n-1) th driver may be separated into two or more than two. Shapes of both the first connecting substrate 6 and the second connecting substrate 4 are not limited to a configuration shown in FIG. 1 and FIG. 2. The shapes can be changed appropriately depending on an arrangement of the driver chip 3 and a layout of the second lines 11.

The material of the first connecting substrate 6 and the second connecting substrate 4 is not limited to specific ones. A cost can be decreased if the same material (for example, FPC: Flexible Printed Circuit) is used. As shown in FIG. 2, mounting can be made easy by providing a connection terminal 10 or the like through which the second connecting substrate 4 can be connected/disconnected with/from the first connecting substrate 6 or the driver chip 3.

A mounting order of the first connecting substrate 6 and the second connecting substrate 4 is not also limited specific ones. If the second connecting substrate 4 and the first connecting substrate 6 are connected, the resultant substrate becomes equivalent to a single substrate. After that, the resultant substrates and the liquid crystal panel may be pressure-bonded thereon. That is, the resultant substrate can be pressure bonded at the same time as the related technology.

In the liquid crystal display 1 using a COG configuration in which the driver chip 3 is directly mounted on the liquid crystal panel 2, a connecting substrate which connects the timing controller 8 with the driver chip 3 includes the first connecting substrate 6 on which the second lines 11 to the driver chip 3 excluding a driver chip located at a terminating area is mounted and the second connecting substrate 4 on which the second lines 11 to the driver chip 3 located at the terminating area and the termination resistor 5. As a result, when a resistance value of the termination resistor is changed depending on a display size or a component layout, it is only necessary to replace the second connecting substrate 4. For this reason, the termination resistor can be easily changed and a component cost and a mounting cost can be reduced.

Second Exemplary Embodiment

Figure 3:
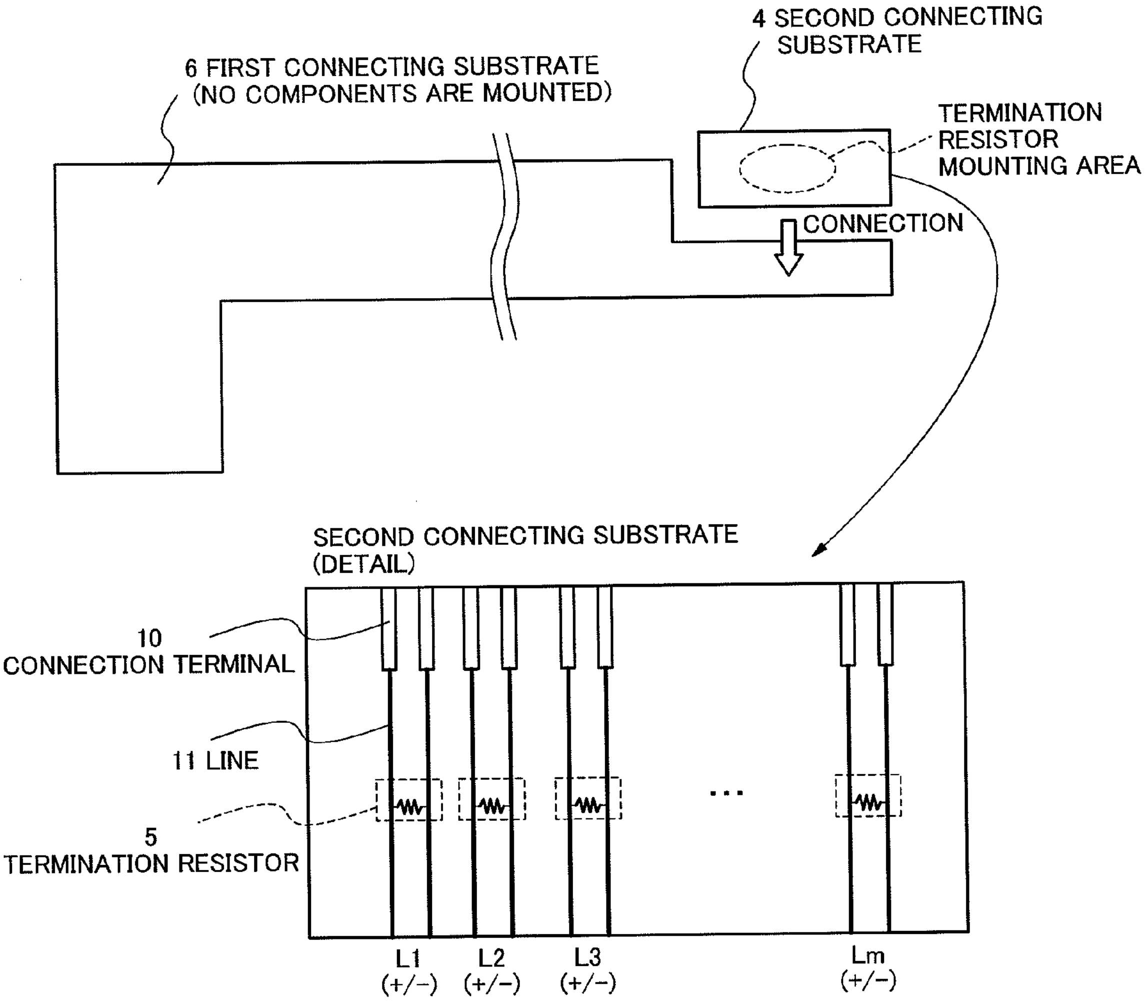
FIG. 3 is a plan view showing a configuration of a connecting substrate according to a second exemplary embodiment and an enlarged view showing a second connecting substrate.

Next, a display device according to the second exemplary embodiment of the present invention will be described with reference to FIG. 3. FIG. 3 is a plan view showing a structure of a connecting substrate of the exemplary embodiment.

A basic configuration of the liquid crystal display 1 is the same as that of the first exemplary embodiment mentioned above. In the second exemplary embodiment, as shown in FIG. 3, a part of the first connecting substrate 6 extends to the driver chip 3 (the n-th driver) located at the terminating area and the second connecting substrate 4 is made of a flexible substrate whose shape is substantially rectangular (here, rectangle). In the configuration above mentioned, since at least one of the above connecting substrates can be made to be tape-shaped, design may be simplified and a cost may be reduced.

In the second exemplary embodiment, it is desirable that the plurality of termination resistors 5 are arranged so that distances between respective termination resistors 5 and the driver chip 3 located at the terminating area become substantially equal to each other. It is only necessary that the connecting substrate corresponding to the driver chip 3 located at the terminating area is separately made. The first connecting substrate 6 corresponding to the first to the (n-1) th driver may be divided into two or more than two. A cost can be reduced, if the first connecting substrate 6 and the second connecting substrate 4 is made of the same material. Mounting can be made easy by providing the connection terminal 10 or the like through which the second connecting substrate 4 can be connected/disconnected with/from the first connecting substrate 6 or the driver chip 3. If the second connecting substrate 4 and the first connecting substrate 6 are connected, the resultant substrate becomes equivalent to a single substrate. After that, the resultant substrates and the liquid crystal panel may be pressure-bonded thereon. That is, the resultant substrate can be pressure-bonded at the same time as the related technology.

Third Exemplary Embodiment

Figure 4:
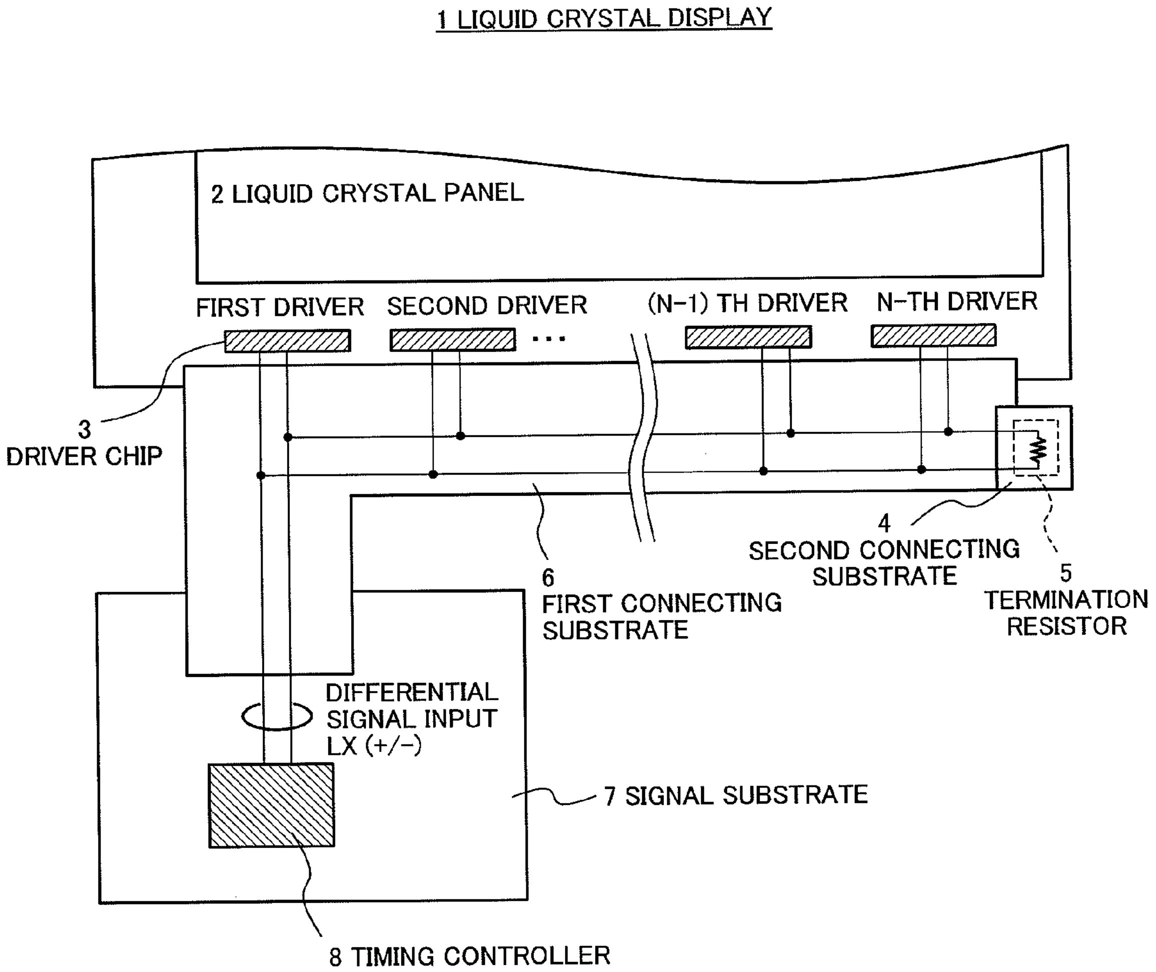
FIG. 4 is a view schematically showing a configuration of a part of a liquid crystal display according to a third exemplary embodiment.
Figure 5:
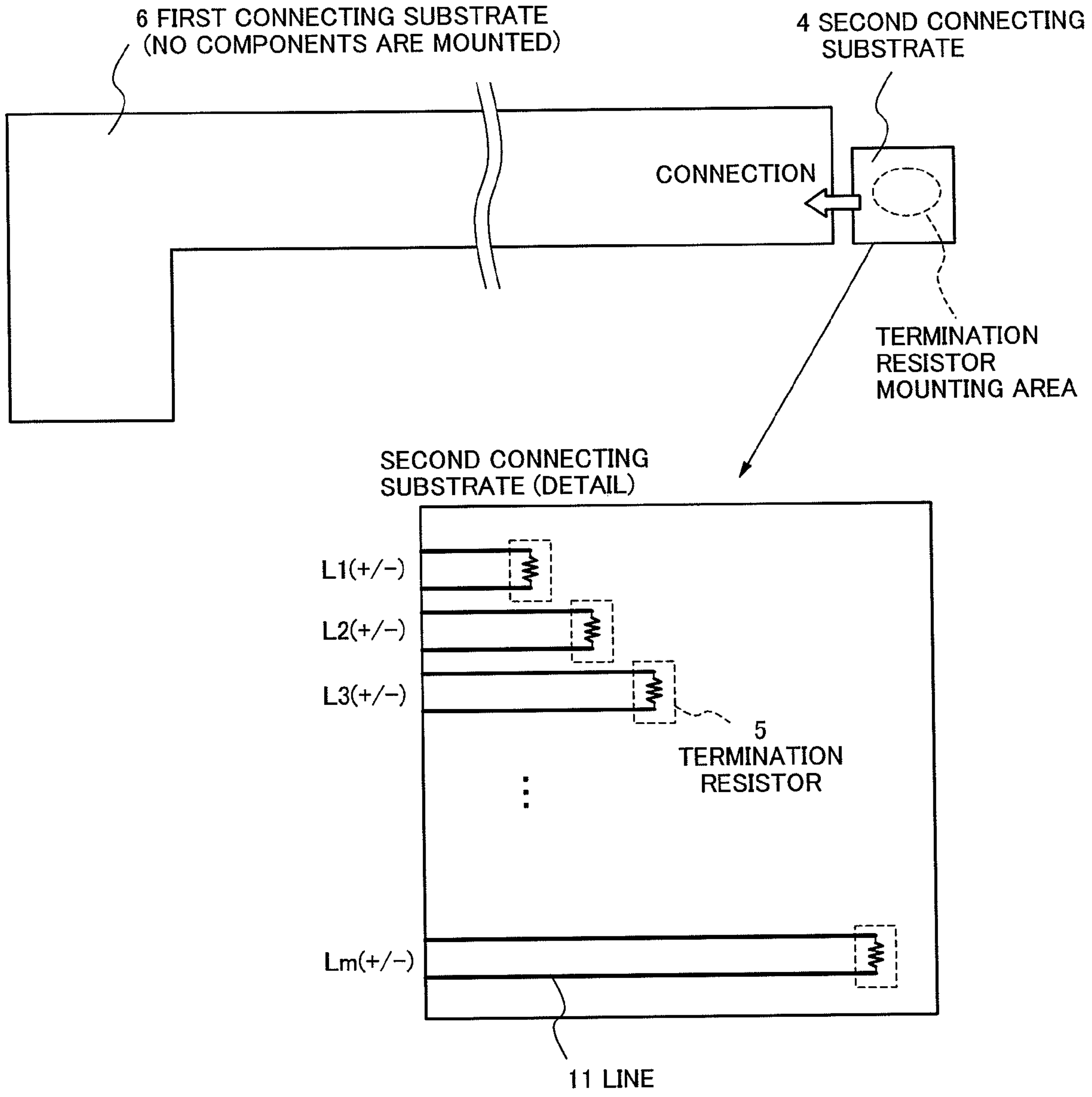
FIG. 5 is a plan view showing a configuration of a connecting substrate according to a third exemplary embodiment and an enlarged view showing a second connecting substrate.
Figure 6:
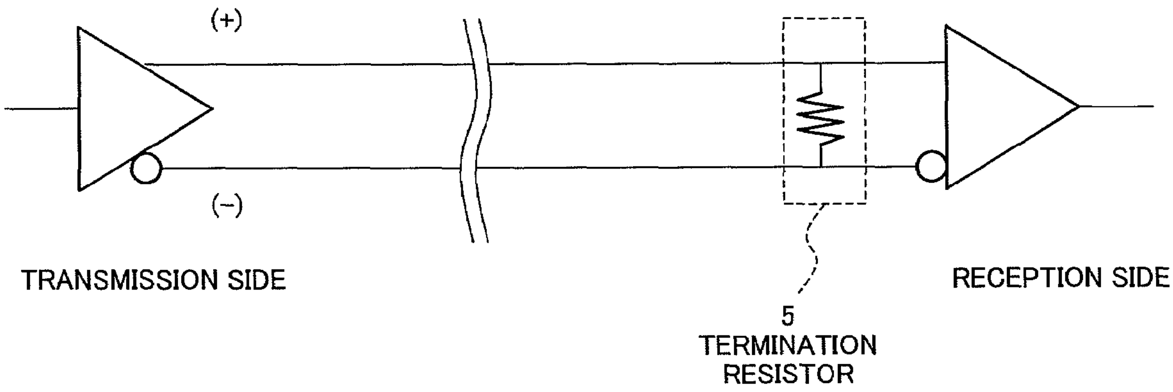
Fig.6 RELATED ART
FIG. 6 is a circuit diagram showing a basic configuration of differential signal lines.
Figure 7:
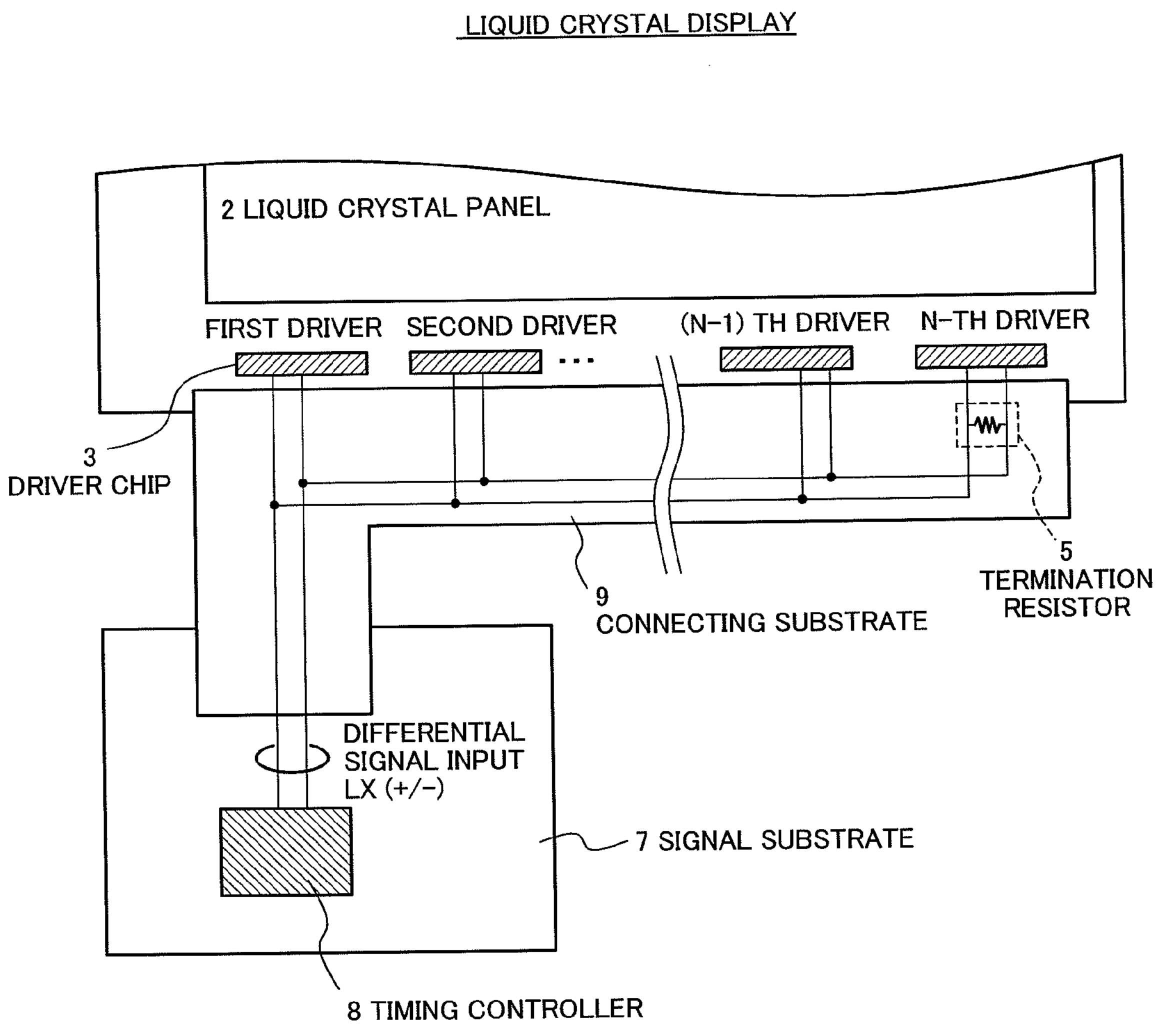
Fig.7 RELATED ART
FIG. 7 is a view schematically showing a configuration of a liquid crystal display using a related technology.
Figure 8A:
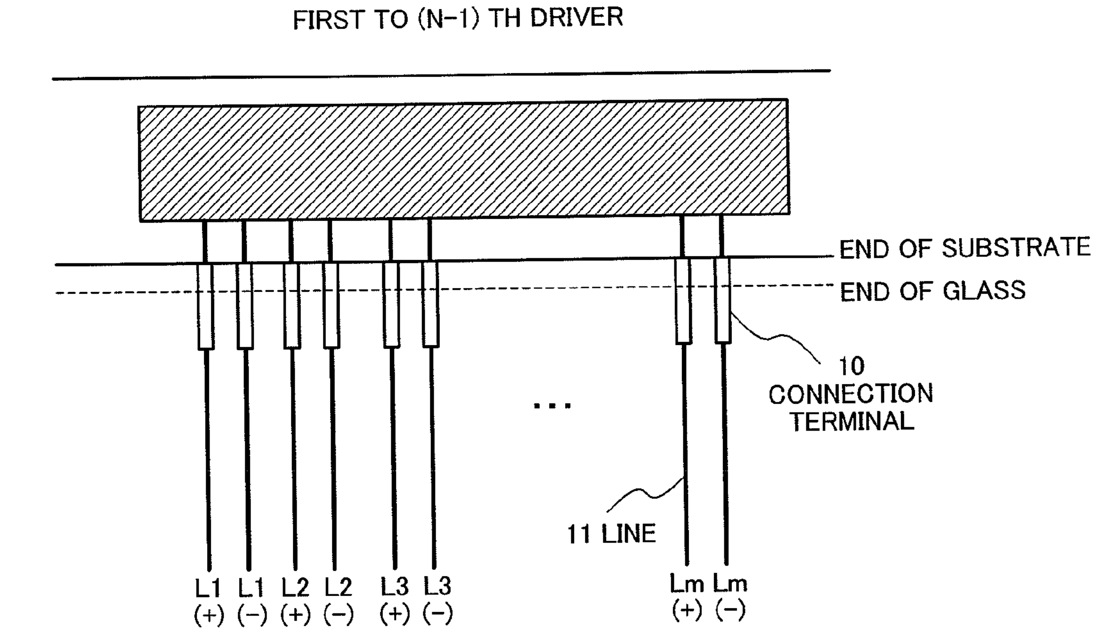
Fig.8A RELATED ART
FIG. 8A is a plan view showing a configuration of a connecting substrate corresponding to a driver chip excluding a driver chip located at a terminating area in a connecting substrate using a related technology.
Figure 8B:
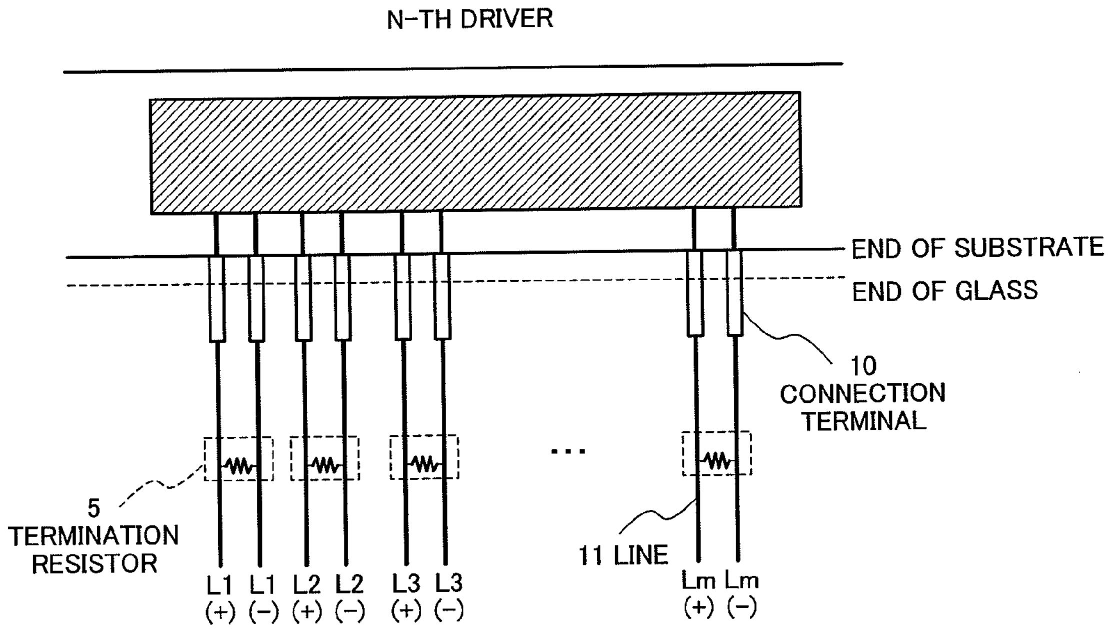
Fig.8B RELATED ART
FIG. 8B is a plan view showing a configuration of a connecting substrate corresponding to a driver chip located at a terminating area in a connecting substrate using a related technology.

Next, a display device according to the third exemplary embodiment of the present invention will be described with reference to FIG. 4 and FIG. 5. FIG. 4 is a view schematically showing a configuration of a part of a liquid crystal display according to the exemplary embodiment. FIG. 5 is a plan view showing a structure of a connecting substrate according to the exemplary embodiment.

A basic configuration of the liquid crystal display 1 is the same as that of the first exemplary embodiment mentioned above. In the third exemplary embodiment, as shown in FIG. 4 and FIG. 5, the second connecting substrate 4 is made rectangular and the termination resistors 5 are arranged at an end of the second lines 11. In the configuration above mentioned, since at least one of the above connecting substrates can be made to be tape-shaped, design may be simplified and a cost may be reduced. Since it is unnecessary to pressure-bond the second connecting substrate 4 and the liquid crystal panel 3, production processes can be simplified.

In the third exemplary embodiment, it is desirable that the plurality of termination resistors 5 are arranged so that distances between respective termination resistors 5 and the driver chip 3 located at the terminating area become substantially equal to each other. In FIG. 5, by considering arrangement of a terminal part for a differential signal, a length of the respective second lines 11 is made gradually different with respect to its position. It is only necessary to separately make the second connecting substrate 4. The first connecting substrate 6 corresponding to the first to the (n-1) th driver may be divided into two or more than two substrates. A cost can be reduced, if the first connecting substrate 6 and the second connecting substrate 4 are made of the same material. Mounting can be made easy by providing the connection terminal 10 or the like through which the second connecting substrate 4 can be connected/disconnected with/from the first connecting substrate 6 or the driver chip 3.

Further, in each of the above-mentioned exemplary embodiments, the driver chip 3 is arranged in one side of the liquid crystal panel 2. However the driver chip 3 may be arranged in a plurality of sides thereof. Accordingly, in each of the above-mentioned exemplary embodiments, the connecting substrate of the present invention is applied to the liquid crystal display 1. The present invention is not limited to the specific exemplary embodiments mentioned above and can be similarly applied to any display device or an apparatus in which a circuit in a device is connected with an external circuit by a connecting substrate including a termination resistor.

The related art described in the background art causes a problem, such as an unnecessary cost occurs, because when a resistance value of the termination resistor is varied, the whole connecting substrate needs to be replaced.

An exemplary advantage according to the invention is that a termination resistor can be easily replaced and also a cost reduction becomes possible by standardizing a connecting substrate. This is because the connecting substrate is composed of a first connecting substrate on which a line to a driver chip excluding a driver chip located at a terminating area is formed and a second connecting substrate on which a line to a driver chip located at the terminating area and a termination resistor are formed. Additionally, this is because a connecting substrate is composed of a first connecting substrate on which lines to all driver chips are formed and a second connecting substrate on which a termination resistor is formed, the termination resistor is formed on only the second connecting substrate. As a result, when a resistance value of the termination resistor is changed, it is only necessary to replace only the second connecting substrate and an unnecessary cost can be reduced.

Additionally, another exemplary advantage of the present invention is that a reduction of a mounting cost becomes possible with respect to a connecting substrate. This is because when a resistance value of a termination resistor is changed, it is only necessary to replace a second connecting substrate on which a termination resistor is formed and it is not necessary to replace a first connecting substrate on which a termination resistor is not formed. Further, the liquid crystal display above mentioned can be replaced to an organic electro luminescence (EL) display, for example.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A display device, comprising:

a display panel on which a plurality of driver chips are mounted by using a COG configuration;

a signal substrate on which a timing controller for generating a differential signal inputted into each of said driver chips is formed; and a connecting substrate which connects said plurality of driver chips with said timing controller, wherein said connecting substrate includes a first connecting substrate on which a first line for inputting said differential signal into a driver chip excluding a driver chip located at a terminating area is formed and a second connecting substrate on which a second line for inputting said differential signal into said driver chip located at said terminating area, and wherein a termination resistor connects said second line for transmitting said differential signal which is formed on said second connecting substrate.

2. The display device according to claim 1, wherein said second line for inputting said differential signal into said driver chip located at said terminating area is formed on said first connecting substrate.

3. The display device according to claim 1, wherein a plurality of termination resistors are formed on said second connecting substrate and said plurality of termination resistors are arranged so that distances between each of said plurality of termination resistors and said driver chip located at said terminating area become substantially equal to each other.

4. The display device according to claim 1, wherein said display device is a liquid crystal display.

5. The display device according to claim 1, wherein said display device is an organic EL display.

6. The display device according to claim 1, wherein said second connecting substrate is a flexible substrate.

7. The display device according to claim 1, wherein said first connecting substrate and said second connecting substrate are made of the same material.

* * * * *